United States Patent [19]

Schultz

[11] Patent Number: 4,458,394
[45] Date of Patent: Jul. 10, 1984

[54] STAKE FASTENER FOR ANIMAL TRAP

[76] Inventor: Daryl A. Schultz, R.R. 2, Box 92-A, Rensselaer, Ind. 47979

[21] Appl. No.: 386,569

[22] Filed: Jun. 9, 1982

[51] Int. Cl.³ .............................................. A01M 23/26
[52] U.S. Cl. ........................................ 24/457; 43/96; 24/337; 24/498; 24/521
[58] Field of Search ................ 24/248 E, 263 B, 328, 24/333, 337, 257; 248/316.3, 316.4, 225.4; 43/90, 92, 96, 97

[56] References Cited

U.S. PATENT DOCUMENTS

| 222,086 | 11/1879 | Slemmer | 24/328 |
|---|---|---|---|
| 1,480,977 | 1/1924 | Wilkins | 24/337 |
| 2,460,640 | 2/1949 | Jensen et al. | 24/328 |
| 2,894,307 | 7/1959 | Hogan et al. | 24/248 E |
| 3,013,759 | 12/1961 | Close | 248/225.4 |
| 3,016,225 | 1/1962 | Hughes et al. | 248/225.4 |
| 3,747,259 | 7/1973 | Pellowski | 43/96 |
| 3,991,509 | 11/1976 | Frost | 43/90 |

FOREIGN PATENT DOCUMENTS 355262  5/1931  United Kingdom .................... 43/96

Primary Examiner—Gene Mancene
Assistant Examiner—David I. Tarnoff
Attorney, Agent, or Firm—Beveridge, DeGrandi and Kline

[57] ABSTRACT

A stake fastener for an animal trap in which the trap has jaws adapted for pivotal operation about a journal post includes member for surrounding the jaws at a location proximate the post, attachment member for coupling the surrounding member to the post without interfering with the pivotal movement of the jaws, collar member connected to the surrounding member, the collar member adapted to receive a stake, a first tooth member protruding inwardly of the collar member for engaging the stake, and a second tooth member pivotally mounted on the collar member opposite the first tooth member having a series of teeth thereon pivotable between a first position at which the teeth do not engage the stake and a second position at which at least a tooth engages the stake.

1 Claim, 3 Drawing Figures

STAKE FASTENER FOR ANIMAL TRAP

BACKGROUND OF THE INVENTION

The present invention relates to apparatus for use in fastening animal traps to stakes such as stakes protruding from the ground. It is particularly well suited for use with the well-known Conibear traps.

A wide variety of traps have been constructed for the trapping of fur-bearing animals, many employing spring devices for rapidly closing jaw elements when the trap is sprung. While traps for some fur-bearing animals require baiting, unbaited traps are often utilized, which are located within runways, waterways and other passages frequented by animals, wherein the animal is snared as it displaces the trap trigger. A most effective trap of the latter type, which has been widely recognized as humane and preserving the quality of the pelt is the Conibear type trap. A trap of this type is disclosed in U.S. Pat. No. 3,010,245 and U.S. Pat. No. 2,947,107. The entire disclosure of these U.S. patents is incorporated herein by reference. This type of trap is located within animal passages and runways and is widely used in the underwater trapping of muskrats, mink, beaver and other water related animals. The Conibear trap includes a pair of wire jaws biased toward a closed condition by a spring, and when set, the trap resembles a pair of wire rectangles in side by side relationship with the trigger element extending toward the middle of the rectangles. When the trigger is displaced, the wire jaws quickly close to entrap the animal.

The construction of the Conibear trap is such that the trap does not have a base or flat surface upon which it may be readily rested or otherwise positioned. Accordingly, trappers have resorted to juryrigged trap supports. Such supports are usually fabricated from available sticks and twigs, and a chain and anchor are normally utilized to prevent the trap from being carried away. One prior attempt to fabricate a trap holder for a Conibear trap is disclosed in U.S. Pat. No. 4,152,861 to Miller.

It is also known to support traps upon stakes, such as shown in the following U.S. patents;

| U.S. Pat. No. | Patentee |
| --- | --- |
| 1,201,427 | Angvick |
| 1,409,924 | Byrne |
| 1,858,713 | Martin |
| 3,747,259 | Pellowski |

Those prior devices do not, however, provide the advantages of the present invention.

The present invention is versatile in that it can be used not only on Conibear type traps, but many other types. Additionally, it is easily made of very inexpensive materials so that its manufacturing cost can be kept to a minimum. It can be securely fastened to the trap and easily mounted in the field on a stake protruding from the ground, a tree limb or the like. As used herein "stake" means any suitably shaped rod situated in a desired location. When it is desired to move the trap, the fastener can be quickly and easily removed from such a stake.

SUMMARY OF THE INVENTION

There is a need in the art for a stake fastener for both Conibear and other types of traps, which is durable, reliable, and inexpensive.

The present invention fulfills this need by providing a stake fastener for an animal trap in which the trap has jaws adapted for pivotal operation about a journal post including means for surrounding the jaws at a location proximate the post, attachment means for coupling the surrounding means to the post without interfering with the pivotal movement of the jaws, collar means connected to the surrounding means, the collar means being adapted to receive a stake, a first tooth means protruding inwardly of the collar means for engaging the stake, and a second tooth means pivotally mounted on the collar means opposite the first tooth means having a series of teeth thereon, pivotable between a first position at which the teeth do not engage the stake and a second position at which at least a tooth engages the stake. The attachment means can take the form of a set screw bearing against the post.

In a preferred embodiment the collar means has integral therewith a loop means, the surrounding means includes a U-shaped strip having a pair of holes therein aligned with each other and the loop, and a shaft passes through the holes in the U-shaped strip to connect the collar means to the surrounding means. More preferably, the U-shaped strip has two pair of holes, each hole of each pair aligned with the other hole of the pair and the loop, and a first shaft passes through one pair of holes and a second shaft passes through the other pair of holes.

The collar means and its integral loop means can be formed of a strip material. With such construction, the collar means has outward radial flanges formed of the ends of the strip material, and the second tooth means is pivotally mounted on the flanges.

The second tooth means can include a plate and the series of teeth on the second tooth means can take the form peripheral indentations on the plate. Individual teeth in the series can be located at progressively greater distances from the pivotal mounting of the second tooth means on the collar means. The first tooth means can be a lifted portion of the strip material of the collar means.

BRIEF DESCRIPTION OF THE DRAWINGS

The invention will be understood after a reading of the detailed description hereinafter and a study of the drawings in which.

DETAILED DESCRIPTION OF THE PREFERRED EMBODIMENTS

Figure 3:
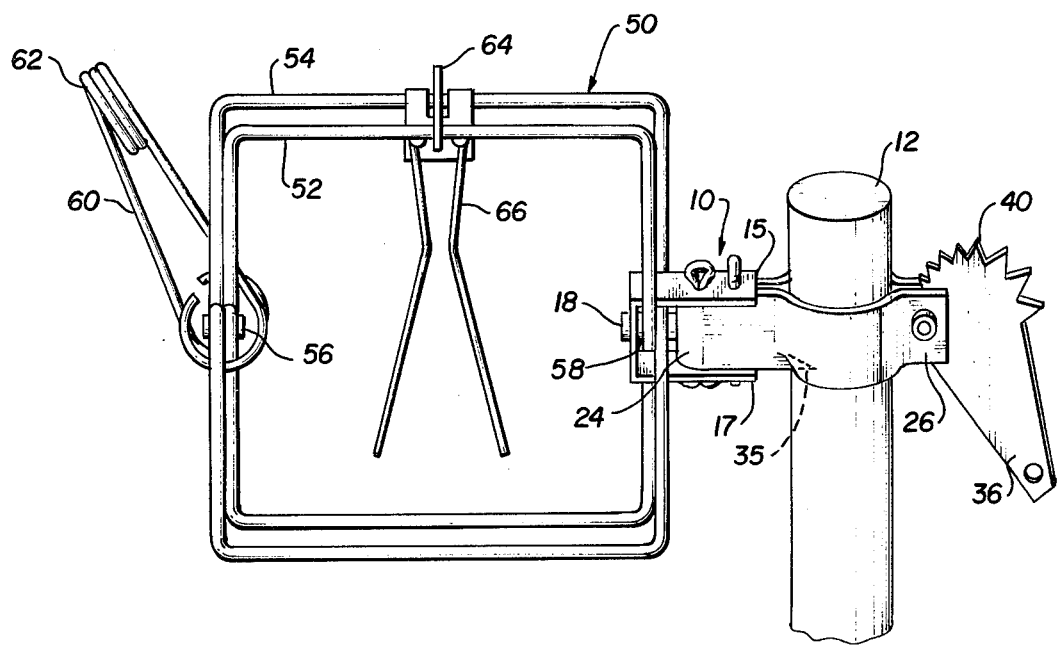
FIG. 3 is a perspective view of the embodiment of FIG. 1 in combination with a Conibear type trap and a stake.

FIG. 3 shows the three main components of the operating trap assembly. The stake fastener 10 unites the trap 50 and stake 12. Typically, stake 12 protrudes from the ground, not shown. The trap 50 includes jaws 52 and 54, which are adapted to pivot about journal posts 56 and 58. The trap, as shown in FIG. 3 is in the set condition, such that spring 60 and its coil 62 urge the jaws to snap together. Catch 64 prevents such movement until dislodged by movement of trigger 66 by an animal.

Previously, Conibear traps such as trap 50 have been marketed separately and trappers have had to devise ways to support the trap in the field. In one such method, coils 62 have been looped over an available stake to attempt to position the trap in the field. Needless to say, the great number of inadvertent trippings of the trap resulting from such mounting left much to be desired. Accordingly, the stake fastener 10 is needed to allow trappers to position trap 50 at any desired height on stake 12.

Figure 1:
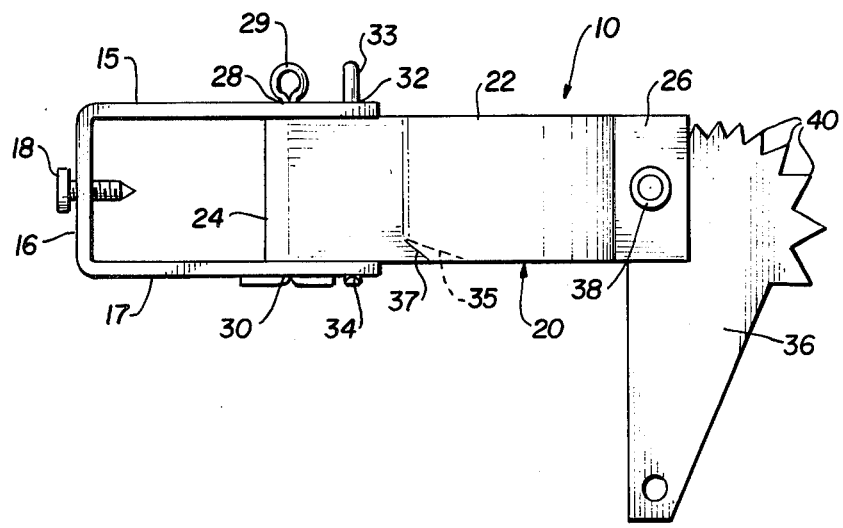
FIG. 1 is a side elevational view of a preferred embodiment of the invention.
Figure 2:
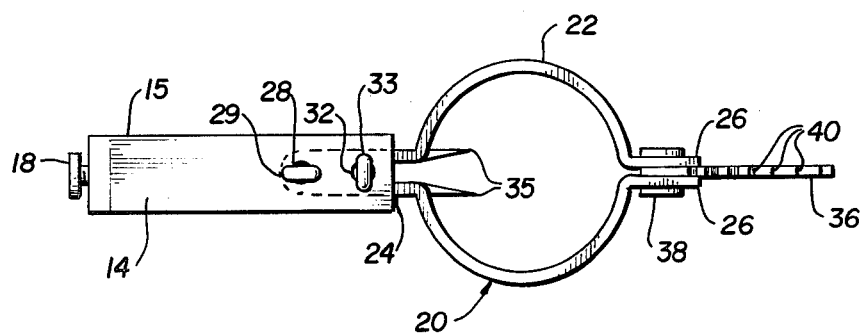
FIG. 2 is a top view of the embodiment of FIG. 1.

As seen in FIGS. 1 and 2, stake fastener 10 includes a means 14 for surrounding the jaws of the trap at a location near the journal post 58. Preferably, the encircling means 14 is fabricated from a strip of metal, so that it can be made very inexpensively. The metal is bent into a U-shaped member having opposing flanges 15 and 17 shown in FIG. 1. At the base 16 of the U, the encircling means is provided with an attachment means such as a set screw 18.

A collar means 20 is adapted to receive the stake 12. It too is preferably made of a strip of metal so that it can be inexpensively but durably formed to the desired shape. It is formed into a cylindrically shaped portion 22 adapted to receive the stake 12. Of course, other shapes could also be used besides cylindrical as long as they are adapted to receive a stake. Also formed from the strip making up collar means 20 are a loop 24 and flanges 26.

Loop 24 is inserted between the opposing flanges 15 and 17 of the U-shaped means 14 such that hole 28 in flange 15 and hole 30 in flange 17 are aligned with the central opening of loop 24, as are holes 32 and 34.

The aligned holes 28 and 30 receive cotter pin 29, and the aligned holes 32 and 34 receive cotter pin 33 to cause the flanges 15 and 17 of the surrounding means 14 to grasp the peripheral edges of the loop 24, thereby connecting the collar means to the surrounding means. Preferably, the resulting connection is rigid.

The bottom of the strip material forming collar means 20 is cut along lines 34 such that first teeth 35 can be formed protruding inwardly of the collar means to engage the stake 12.

As will be apparent, the first teeth 35 are lifted from the strip material forming collar means 20 so as to be disposed to protrude inwardly thereof.

Flanges 26 have pivotally mounted therebetween second tooth means (camming member) 36 on rivet 38. Second tooth means 36 has a series of teeth 40 located at progressively greater distances from the rivet 38.

Referring now to FIG. 3, it will be seen that the stake fastener 10 can be mounted onto a Conibear trap by removal of cotter pins 29 and 33 to allow the loop 24 to be removed from the surrounding means 14. Surrounding means 14 is then used to surround the jaws 52 and 54. Loop 24 is inserted between flanges 15 and 17 such that holes 28-30 and 32-34 are aligned with the central opening of the loop. The resulting assembly is secured in that position by cotter pins 29 and 33. Journal post 58 of trap 50 can be driven towards the loop 24 by means of set screw 18.

In certain Conibear traps 50, the journal posts have dimples in their ends, and the use of a pointed set screw 18 allows the screw to enter the dimple of the journal post to provide for a secure yet flexible mounting.

Having affixed the fastener 10 to the trap 50, the fastener can be attached to a stake 12 by pivoting the second tooth means to a position at which the teeth 40 are outside the cylinder of the ring means, as shown in FIG. 1 and merely slipping the collar means over the end of the stake 12. The first teeth 35 can be forced to engage the stake 12 and the second tooth means can then be pivoted to a position causing its teeth 40 to engage the stake. This locks the stake between the teeth 35 and 40.

Removal of the stake fastener from a stake can be accomplished by reversal of the above steps.

It will be apparent that by providing the teeth 40 at various distances from the rivet 38, different sized stakes 12 can be accommodated.

The present invention provides a stake fastener which can be mounted on preexisting Conibear traps or sold together with new traps to form a complete trap assembly. It is rugged and durable, yet inexpensive to manufacture and convenient to use.

What is claimed is:

1. A stake fastener for an animal trap in which the trap has jaws adapted for pivotal operation about a journal post comprising:

a U-shaped strip for surrounding the jaws at a location proximate the post and having two pairs of holes therein, one hole of each pair aligned with a hole of the other pair;

an attachment means for coupling said surrounding means to the post without interfering with the pivotal movement of the jaws and including a set screw bearing against said post;

collar means made of a strip material connected to said U-shaped strip and having a loop means aligned with said pairs of holes and said strip material having the ends thereof formed into outwardly radial flanges, said collar means adapted to receive a stake;

first and second shafts passing through said pairs of holes in said U-shaped strip and said loop to connect said collar means to said U-shaped strip, a first tooth means protruding inwardly of said collar means for engaging the stake and formed as a lifted portion of said strip material of said collar means, and a second tooth means in the form of a camming member pivotally mounted on said flanges of said collar means opposite said first tooth means and having a series of teeth thereon, individual ones of which are located at progressively greater distances from the mounting of said camming member on said flanges, said camming member being pivotable between a first position at which said teeth do not engage the stake and a second position at which at least a tooth engages the stake.

* * * * *